United States Patent
Sikand et al.

(10) Patent No.: US 9,590,824 B1
(45) Date of Patent: Mar. 7, 2017

(54) SIGNALING HOST MOVE IN DYNAMIC FABRIC AUTOMATION USING MULTIPROTOCOL BGP

(71) Applicant: Cisco Technology, Inc., San Jose, CA (US)

(72) Inventors: Vrishab Sikand, Lexington, MA (US); Liqin Dong, San Jose, CA (US); Shyam Kapadia, San Jose, CA (US); Lukas Krattiger, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 374 days.

(21) Appl. No.: 14/451,575

(22) Filed: Aug. 5, 2014

(51) Int. Cl.
*H04L 12/46* (2006.01)
*H04L 29/12* (2006.01)
*H04L 12/56* (2006.01)
*H04L 29/06* (2006.01)

(52) U.S. Cl.
CPC ........ *H04L 12/4666* (2013.01); *H04L 45/741* (2013.01); *H04L 61/103* (2013.01); *H04L 69/18* (2013.01)

(58) Field of Classification Search
None
See application file for complete search history.

(56) References Cited

U.S. PATENT DOCUMENTS

| | | | |
|---|---|---|---|
| 7,076,251 B2 | 7/2006 | Jagadeesan et al. | |
| 2004/0081122 A1 | 4/2004 | Koodli et al. | |
| 2011/0238820 A1 | 9/2011 | Matsuoka | |
| 2011/0320577 A1 | 12/2011 | Bhat et al. | |
| 2012/0331142 A1 | 12/2012 | Mittal et al. | |
| 2013/0024553 A1 | 1/2013 | Mittal et al. | |
| 2013/0034015 A1 | 2/2013 | Jaiswal et al. | |
| 2013/0275592 A1 | 10/2013 | Xu et al. | |
| 2013/0282498 A1 | 10/2013 | Korhonen | |
| 2014/0075047 A1* | 3/2014 | Narasimhan | ........ H04L 41/0813 709/238 |
| 2015/0124826 A1* | 5/2015 | Edsall | ................. H04L 12/4633 370/392 |
| 2015/0163192 A1* | 6/2015 | Jain | ....................... H04L 61/103 370/255 |

* cited by examiner

*Primary Examiner* — Wei Zhao
*Assistant Examiner* — Ronald H Davis
(74) *Attorney, Agent, or Firm* — Edell, Shapiro & Finnan, LLC

(57) ABSTRACT

Techniques are presented to signal where a virtual machine (host) has moved in a data center networking environment. These techniques use Multiprotocol Border Gateway Protocol (MP BGP) alone, and are particularly useful in a multi-vendor environment using existing standards. Reverse Address Resolution Protocol (RARP) broadcast is not needed, therefore, no L2 extension is needed across a data center interface for tenants that do not require L2 extension for purposes other than a host move. This scheme works for both inter- and intra-fabric moves.

29 Claims, 14 Drawing Sheets

SIGNALING HOST MOVE IN DYNAMIC FABRIC AUTOMATION USING MULTIPROTOCOL BGP

TECHNICAL FIELD

The present disclosure relates to data center networking.

BACKGROUND

The data center networking technology called Dynamic Fabric Automation (DFA) has been developed by Cisco Systems, Inc., to simplify, optimize, and automate a unified fabric environment. DFA is based on four building blocks: fabric management, workload automation, optimized networking and virtual fabrics. Each of these building blocks provides a group of functions that can be deployed independently in a modular fashion. This approach allows easy adoption of new technology as the data center fabric architecture evolves.

DESCRIPTION OF EXAMPLE EMBODIMENTS

Overview

Figure 1:
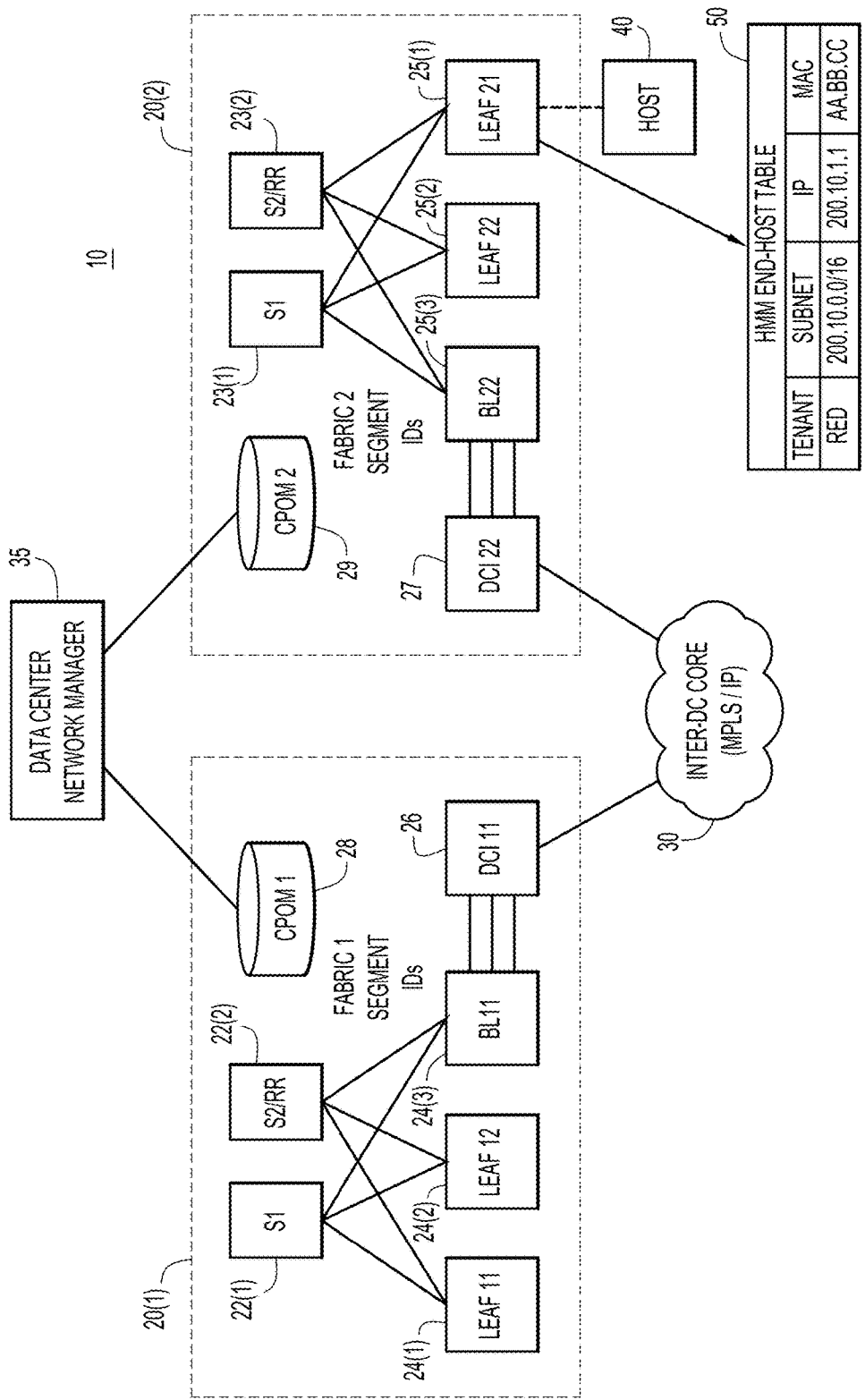
FIG. 1 is a block diagram of a network environment in which host movement signaling techniques presented herein may be employed, according to an example embodiment.

Techniques are presented herein for use in a network that includes a plurality of switches including a first switch and a second switch. In accordance with one aspect, the first switch receives a reverse address resolution protocol message indicating a virtual machine has moved from the second switch to the first switch, the reverse address resolution protocol message including a media access control (MAC) address of the virtual machine and indicating a virtual local area network (VLAN) of which the virtual machine is a part, and wherein the VLAN indicates a subnet and a Virtual Routing Forwarding (VRF) domain of the virtual machine and the MAC address identifies the virtual machine within a context of the VLAN, subnet and the VRF domain. The first switch detects the reverse address resolution protocol message, and prevents from sending the reverse address resolution protocol message into the network. The first switch selects a first mobility address of a pair of mobility addresses from a pool of mobility addresses allocated to the first switch. The first switch generates a Border Gateway Protocol (BGP) update message that includes the first mobility address, the MAC address of the virtual machine and the subnet of the virtual machine. The BGP update message is sent into the network to advertise the first mobility address associated with the virtual machine at the first switch and such that MAC tables at nodes in the network can be updated for the virtual machine according to the BGP update message.

In accordance with another aspect, the second switch from which the virtual machine has moved, receives a BGP update message originated by the first switch to which the virtual machine has moved. The BGP update message advertises the first mobility address in association with the virtual machine, the MAC address of the virtual machine and the subnet of the virtual machine. The second switch compares, within a VRF domain, the MAC address and the subnet contained in the BGP update message with stored data at the second switch, the stored data indicating a MAC address and a subnet within a VRF domain, and an Internet Protocol (IP) address for each virtual machine served by the second switch. Upon determining a match of the MAC address and subnet contained in the BGP update message with the stored data, the second switch generates a BGP response message that advertises a second mobility address of the pair and includes the IP address of the virtual machine. The BGP response message advertising the second mobility address is sent into the network.

Example Embodiments

One of the key innovations of DFA is an enhanced forwarding mode (EF), where broadcasts such as those associated with the Address Resolution Protocol (ARP) are terminated at the access layer. Layer (L3) forwarding is provided for all unicast Internet Protocol (IP) traffic (including forwarding within the subnet for switch virtual interfaces). The goal of bringing L3 forwarding to the access layer is to provide all the benefits of Layer 2 (L2) forwarding, such as any load anywhere, virtual machine (host) mobility etc., to achieve L3 forwarding without any of the limitations of L2, such as blocked ports or unnecessary broadcast such as ARP.

In a massively scalable data center environment where there is substantial east-west traffic and any load anywhere, including across data centers spread over geographical areas, avoiding unnecessary broadcasts is of great value. Moreover, in massively scalable data centers with highly virtualized environments, having hundreds of virtual servers or virtual machines (referred to as "hosts" herein) on each port and tens of thousands of ports, and virtual local area network (VLAN) anywhere topologies, broadcast packets such as Reverse ARP (RARP) and ARP cause unnecessary load in a large domain on already stressed server resources.

In the case of enhanced forwarding subnets in DFA, where L3 is accomplished at the access layer and broadcasts are terminated at leaf nodes, the MAC address of the host is only known at the leaf node where a host is attached and discovered. Multiprotocol Border Gateway Protocol (MP BGP) (L3VPN) is then used to signal other leaf nodes about the reachability to this host. Only the IP address of the host is advertised. This greatly increases the scalability of leaf nodes as they only need to store IP address and not Media Access Control (MAC) addresses of hosts. This also means that only the leaf node to which host is directly attached has the MAC-to-IP binding for a host.

When a host moves from one leaf node to another, most hypervisors have the host send a RARP packet towards the new switch indicating a virtual machine has moved. The RARP packet only contains the MAC address of the host, and not its IP address.

One feature of DFA is that if a tenant does not have non-IP traffic or L2 broadcast traffic, then a L2 broadcast of any kind in the fabric is not required. Current move procedures implemented in DFA require flooding this RARP message into the fabric. If the host has moved across fabrics then a L2 extension is required just to carry this RARP. For tenants that have only IP traffic, this is just overhead. It also puts limits on the DFA which would otherwise have no broadcast traffic for unicast IP.

Within a single fabric, proprietary solutions can be implemented but for moves across fabrics which may go across a data center interconnect (DCI) box comprised of equipment from multiple vendors, a solution which is standard based and affords vendor-interoperability is needed. If a host moves from one fabric to another and sends a RARP packet after the move, the RARP does not go across the DCI without a L2 extension such as Virtual Private LAN service (VPLS) or Overlay Transport Virtualization (OTV).

Thus, a solution is desired that can support a MP BGP based control plane and interoperability across a multi-vendor Multiprotocol Label Switching (MPLS) core network.

Reference is now made to FIG. 1. FIG. 1 shows a data center network environment 10 including first and second switch fabrics 20(1) and 20(2). Each switch fabric includes a plurality of switches (nodes) arranged in a spine-leaf architecture in which each leaf node is connected to each spine node. For example, fabric 20(1) includes spine nodes 22(1) and 22(2) denoted S1 and S2/RR, respectively, and leaf nodes 24(1), 24(2) and 24(3), also denoted Leaf11, Leaf12 and Border Leaf 11 (BL11). The "RR" designation for spine node S2 means that S2 serves as a BGP Route Reflector, to ensure BGP messages are sent to all nodes in fabric 20(1). Fabric 20(1) also includes a data center interconnect node 26 denoted DCI11. Similarly, fabric 20(2) includes spine nodes 23(1) and 23(2) denoted S1 and S2/RR, respectively, and leaf nodes 25(1), 25(2) and 25(3), also denoted Leaf11, Leaf12 and BL22. Spine node 23(2) includes the "RR" designation to denote the BGP Route Reflector function for fabric 20(1). Fabric 20(2) also includes a data center interconnect node 27 denoted DCI22. Border Leaf nodes BL11 and BL22 ensure that BGP messages from one fabric are sent to the adjacent fabric via DCI11 and DCI22.

Fabrics 20(1) and 20(2) communicate with each other via an inter-data center (Inter-DC) core network 30 that uses MPLS and IP, for example. In addition, each fabric has a management entity. For example, fabric 20(1) has a management entity called a centralized point of management (CPOM 1) shown at reference numeral 28 and fabric 20(2) has a management entity (CPOM 2) shown at reference numeral 29. These management entities configure/provision the nodes in the respective fabrics with information appropriate for performing the techniques presented, as will become apparent from the following description. CPOM 1 and CPOM 2 are also considered part of data center network manager (DCNM) 35. The DCNM 35 may be embodied as a software application running on a server that is in communication with CPOM 1 and CPOM 2. The DCNM 35 is a graphical user interface that abstracts a command line interface used to configure the nodes in the fabrics 20(1) and 20(2).

Each leaf node is a switch that includes a plurality of ports to enable connectivity with other nodes. The leaf nodes shown in FIG. 1 are also known as Top-of-Rack (ToR) switches. An example block diagram of a leaf node is provided in FIG. 6, described hereinafter. Among other functions, the leaf node executes a host mobility manager (HMM) function to track movement of hosts between leaf nodes. The HMM receives MAC-learn events from a host-facing interface of a switch. Also, the HMM ensures that the IP address that is used for ARP functions gets bound to (associated with) the MAC address of the host, and gets distributed into the fabric via MP BGP.

Presented herein are techniques to exploit the enhanced forwarding capabilities of DFA in order to use L3 DCI routing techniques to handle mobility of hosts within and between data center fabrics. These techniques reduce the need to use L2 for updating host movements, and reduce flooding of ARP messages.

FIG. 1 shows a host 40 (a virtual machine) currently connected to leaf node 25(1) (Leaf21) in fabric 20(2). In this example, the host 40 is part of a tenant or Virtual Routing Forwarding (VRF) domain referred to as RED, in a subnet of 200.10.0.0/16, has an IP address of 200.10.11.1 and a MAC address of AA.BB.CC. The HMM function of leaf node 25(1) stores data for an end-host table 50 containing this information about host 40 and about other virtual machines that reside at the leaf node 25(1). FIGS. 2A-2I are diagrams similar to FIG. 1, but illustrate steps in a process for handling the roaming of a host according to an example embodiment. The host 40 is a virtual machine that runs on a physical server on top of a Hypervisor and connects to physical devices via a software function, also referred to as a virtual switch, which also runs in the physical server. Messages sent on behalf of the host 40 are sent by the virtual switch software.

Figure 2A:
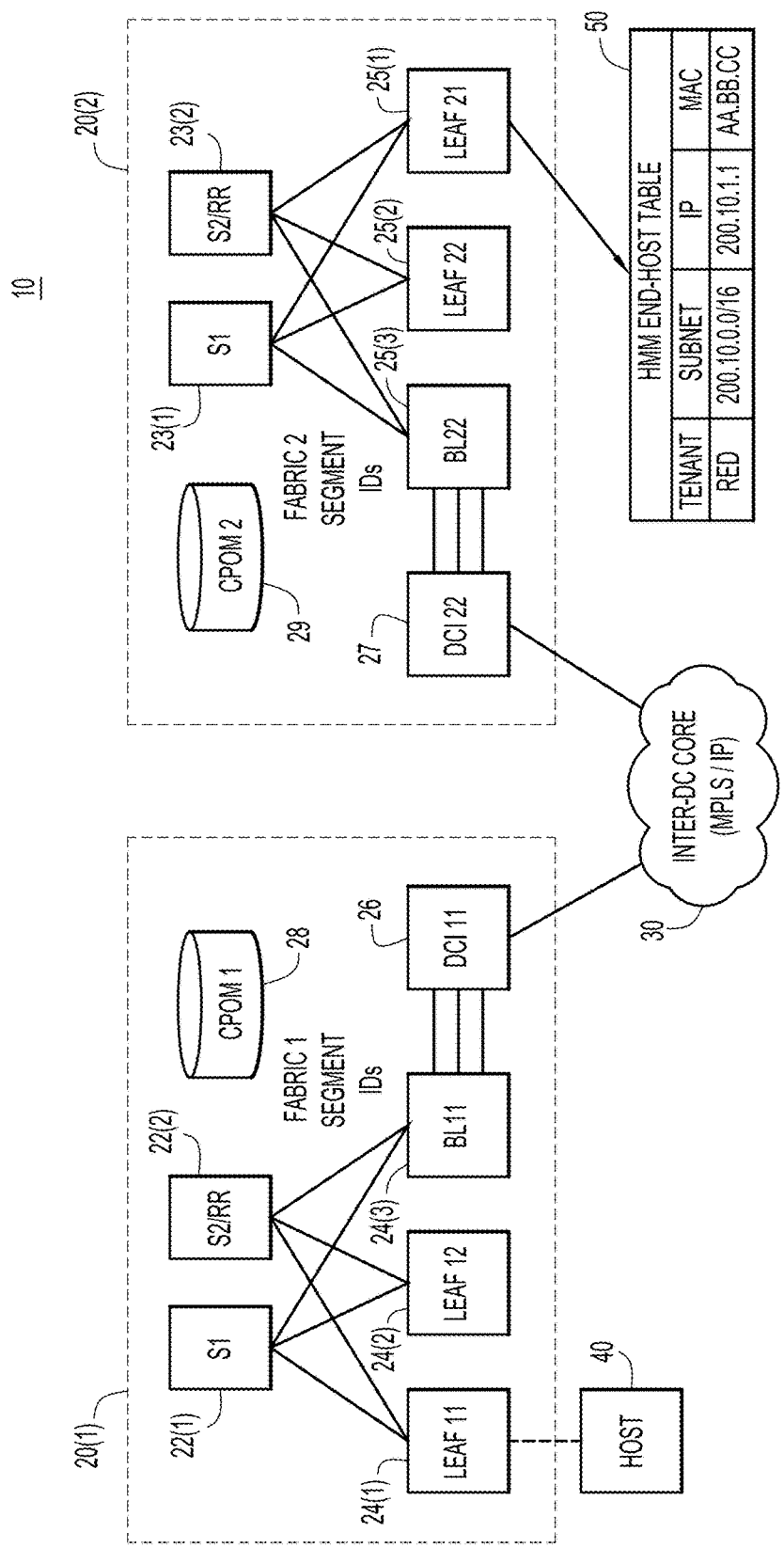
FIGS. 2A, 2B and 2D through 2I are diagrams similar to FIG. 1, but illustrating steps of the signaling techniques presented herein, according to example embodiments.
Figure 2B:
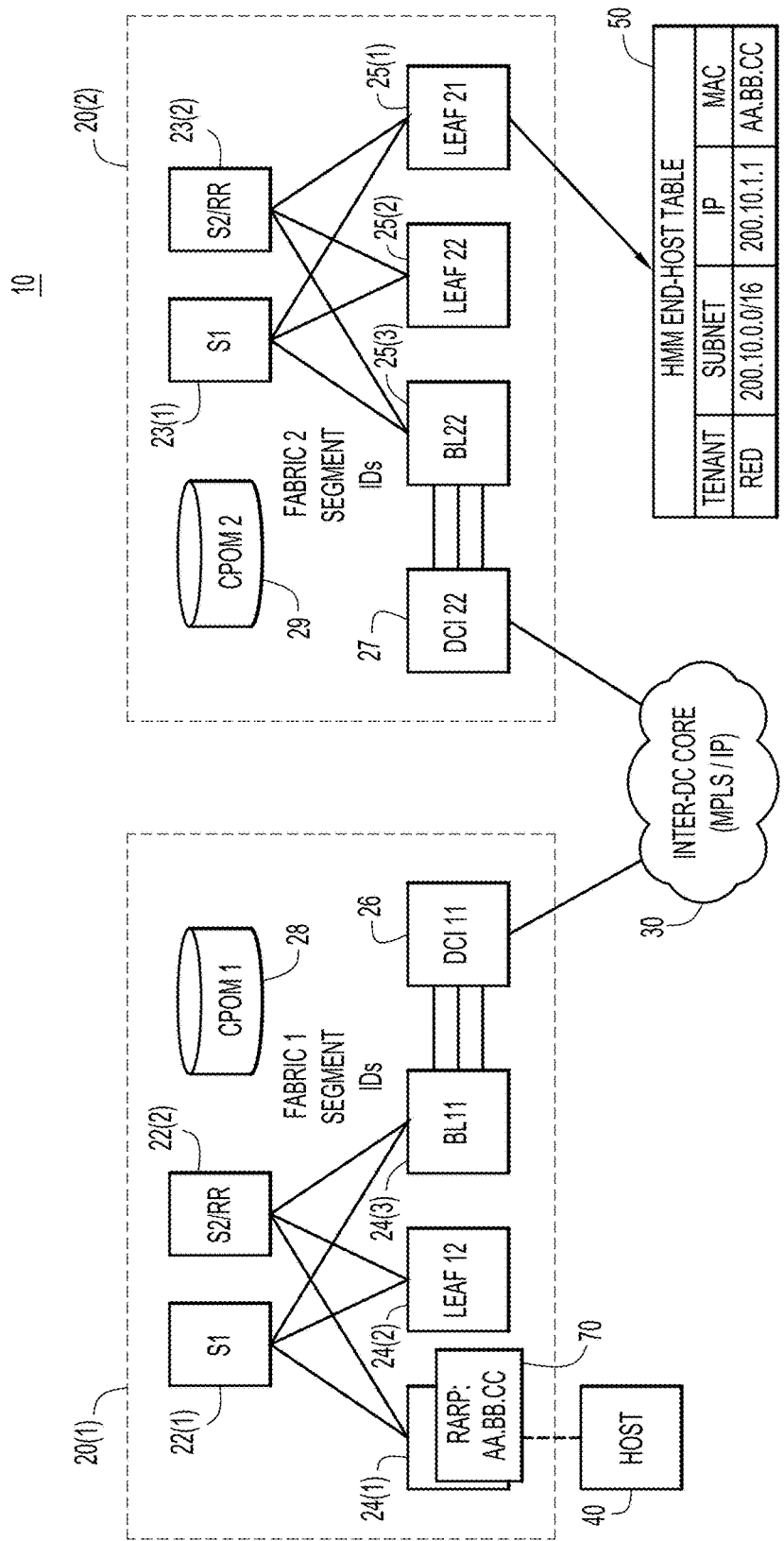

As shown in FIG. 2A, the host 40 moves from Leaf21 in fabric 20(2) to Leaf11 in fabric 20(1). The move may occur due to load balancing or other issues in a data center. Next, in FIG. 2B, a RARP message 70 is sent to Leaf11 indicating that the host 40 has moved to Leaf11 from Leaf21. The RARP message 70 includes a MAC address of the host and also indicates a virtual local area network (VLAN) of which the host 40 is a part. The VLAN indicates a subnet and a VRF domain of the host 40, and the MAC address identifies the host 40 within a context of the VLAN, subnet and the VRF domain. The VRF domain for a host is known by local configuration at leaf nodes and is transported by BGP as the Route Target (RT) attribute. Without using the techniques presented herein, the RARP message 70 would have to be flooded across the fabric 20(1) (and fabric 20(2)) in order to inform all of the nodes in the fabric that the host 40 has moved to Leaf11.

Figure 2C:
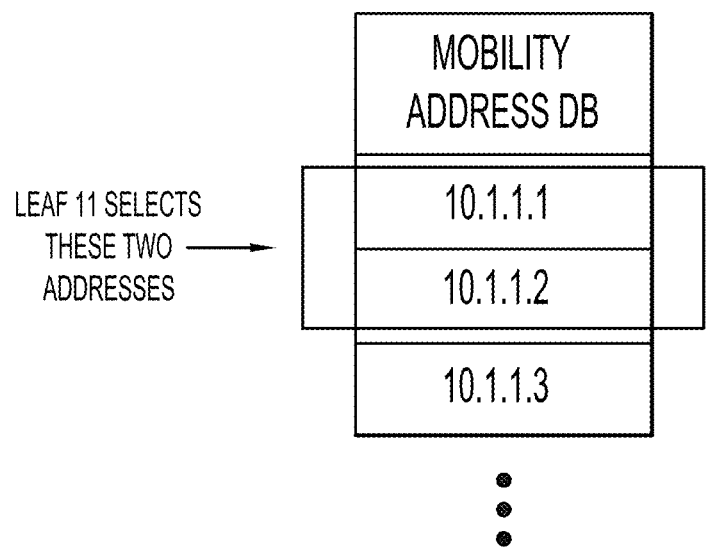
FIG. 2C is a diagram illustrating a pool of mobility addresses, in accordance with an example embodiment.

Leaf11 receives the RARP message 70. Each leaf node stores a unique pool of mobility addresses used as described herein. The details of the pool of mobility addresses is described further hereinafter. The HMM function of Leaf11 traps the RARP message and treats it as mobility event, and importantly, prevents the RARP message from being sent into the network. The Leaf11 then selects a pair of free/available mobility address from its allocated unique pool of mobility addresses. FIG. 2C shows a database for the pool of mobility addresses shown at reference numeral 80, which in this example, includes address 10.1.1.1, 10.1.1.2, 10.1.1.3, etc. In fact, and in one example, the HMM function of the Leaf11 selects two contiguous mobility addresses. In this example, the Leaf11 selects the pair of addresses 10.1.1.1 and 10.1.1.2 from the pool 80. Note that these addresses are offset by each other by "1". This is only an example. The selected mobility addresses could be offset from each other by a different amount, as long as this offset amount is known among the leaf nodes in the network.

Figure 2D:
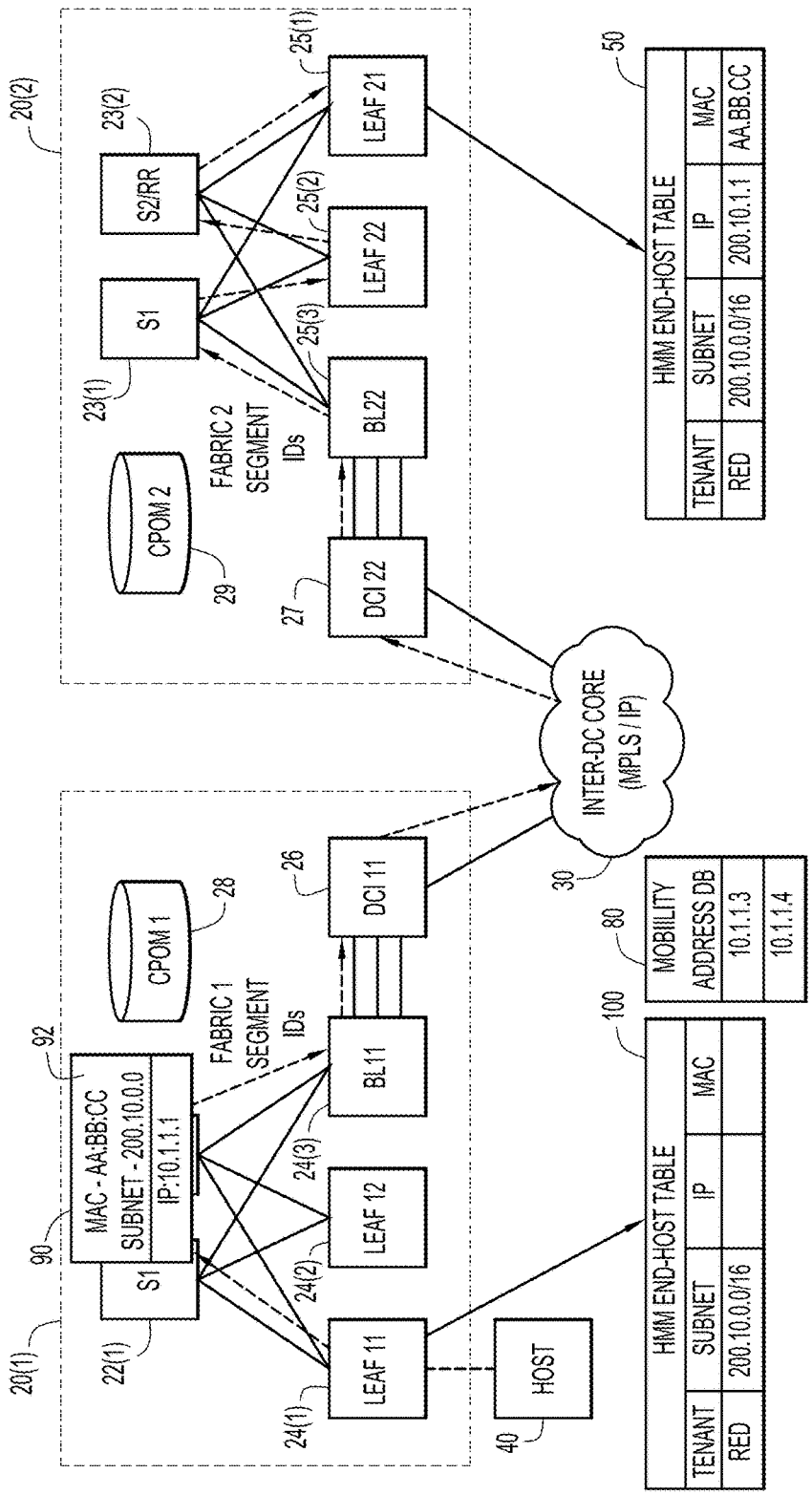

Reference is now made to FIG. 2D. The Leaf11 generates a BGP update message 90 that includes a first of the two addresses selected from pool of mobility addresses, and the MAC address and a subnet of the host encoded in BGP cost community attributes of the BGP update message. In this example, mobility address 10.1.1.1 is advertised in (e.g., in Network Layer Reachability Information (NLRI)) in the BGP update message 90, and the MAC address AA:BB:CC of the host and subnet 200.10.0.0 to which the host belongs, are encoded into the cost community attributes as shown at reference numeral 92. The HMM function of Leaf11 adds the MAC address and subnet of host 40 into its unicast routing information base (URIB). FIG. 2D also shows the HMM end-host table 100 maintained by Leaf11 for the host 40, and the pool 80 of mobility addresses, which now does not include 10.1.1.1 and 10.1.1.2 because they have been taken for use in order to advertise the new location of host 40.

The BGP update message is sent into the network to advertise the first mobility address associated with the host 40 at Leaf11 and such that MAC tables at nodes in the network can be updated for the host 40 according to the BGP update message 90. As shown by the dashed arrows in FIG. 2D, the BGP update message 90 is passed on throughout fabric 20(1) and eventually across the Inter-DC core 30 into fabric 20(2). All of the nodes running BGP will receive the BGP update message 90. Each node in the fabric that receives the BGP update message 90 is informed of the fact that the host with the MAC address contained in the BGP update message 90 has moved to Leaf11.

When a leaf node receives the BGP update message 90, it passes the route and cost community attributes (in which the MAC address and subnet of the host 40 are encoded) to the HMM function of the leaf node. The information contained in this BGP update message includes information indicating which tenant this belongs to (L3 Virtual Network Instance (VNI)), cost community subtype that indicates "I am carrying MAC and subnet information," MAC address of the host, subnet address of the host, address of the advertising node (which in this example is the address of Leaf11) and indicating the leaf node to which the host has moved if an intra-fabric move or a local border leaf if an inter-fabric move. There are several ways to identify VRF domain of a host, such as the RT attribute in BGP, L3 VNI or interface for which a BGP session is configured.

Figure 2E:
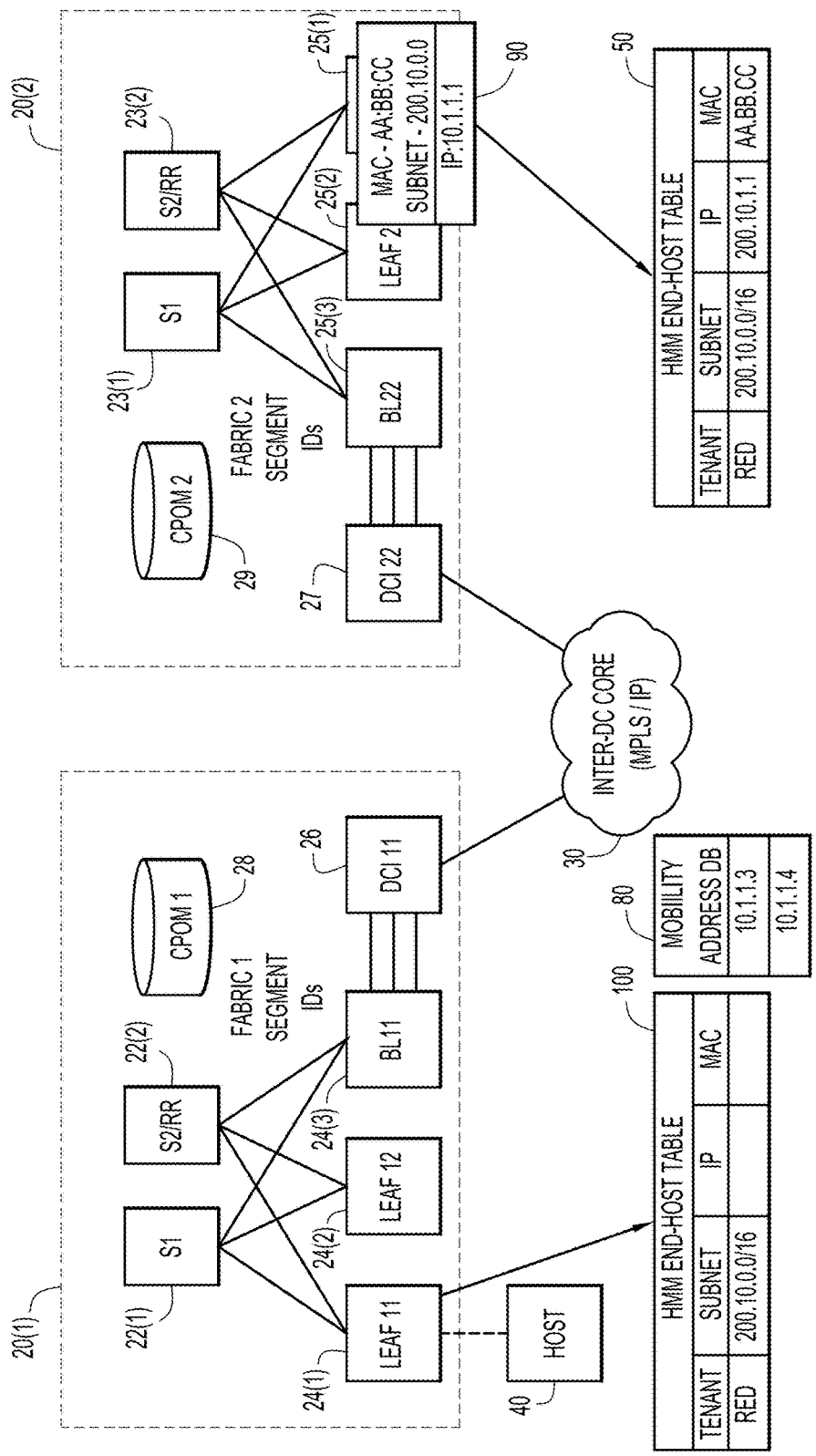

The HMM function of the leaf node performs a lookup in its local host database (end-host table) to determine if there is a matching host address. Thus, eventually, the BGP update message 90 reaches Leaf21, the node from which the host 40 has moved, as shown in FIG. 2E. The HMM function of Leaf21 will compare the MAC address and subnet of host 40 carried in the BGP update message 90 and determine that it matches with an entry stored in its end-host table 50. More specifically, Leaf21 compares the MAC address and the subnet contained in the BGP update message within the context of the VRF domain of the virtual machine with stored data that indicates a MAC address and a subnet within a VRF domain, and an IP address for each virtual machine served by Leaf 21. Since the movement of host 40 to Leaf11 has not been completed, Leaf21 still stores information for host 40 as if host 40 still resides at Leaf21.

Figure 2F:
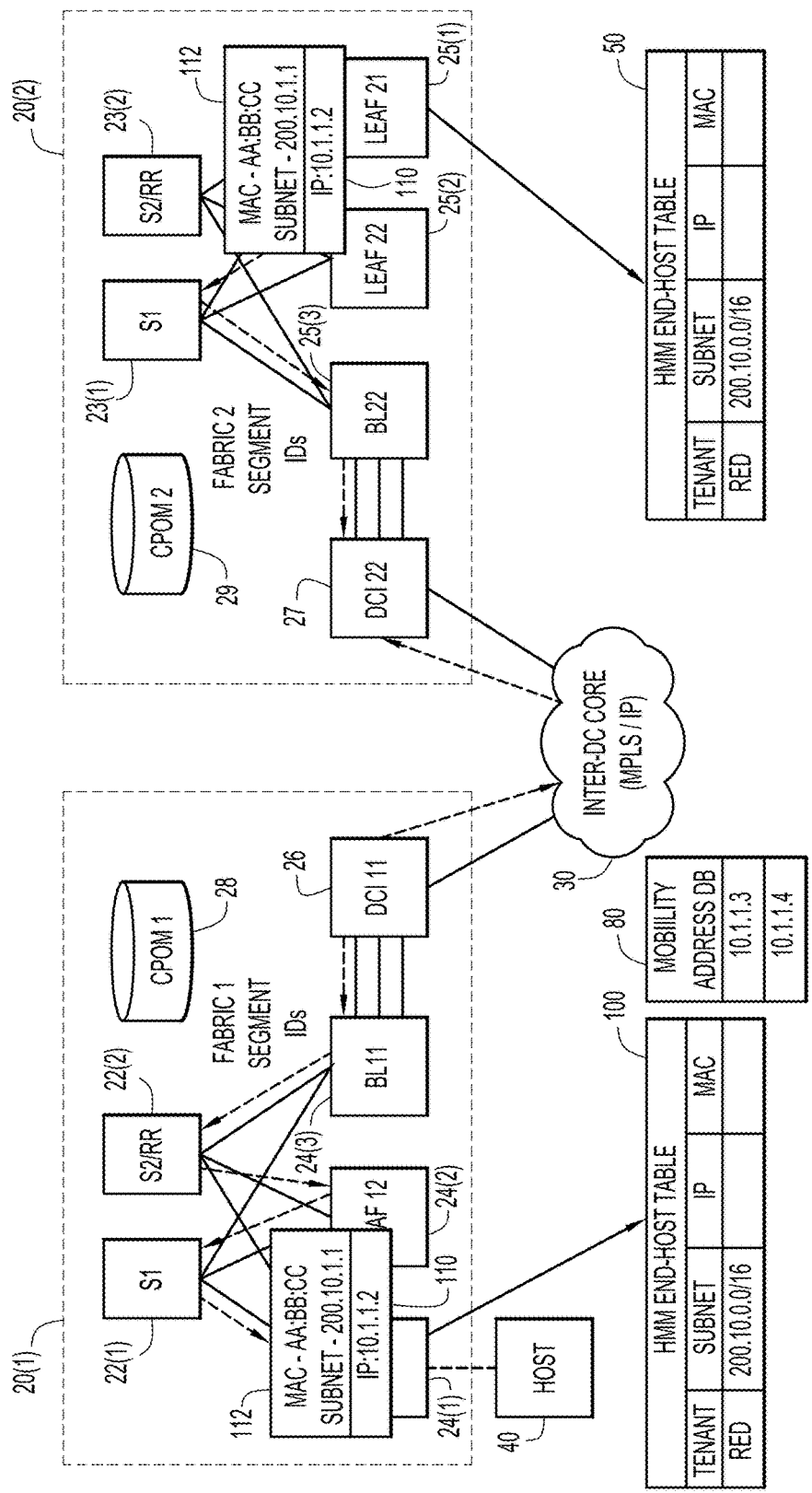

Turning to FIG. 2F, when Leaf21 finds a match for the MAC address and subnet contained in the BGP update message 90, it uses the second mobility address of the pair selected by Leaf11 (it takes the next consecutive mobility address from the one contained in the BGP update message 90, i.e., 10.1.1.2) to advertise the second mobility address, and including a MAC address to IP address binding for host 40. The offset amount between the first mobility address and the second mobility address is a priori known at the Leaf11 and Leaf21, and as described above, may be "1" or some other predetermined amount. The Leaf21 generates a BGP response message 110 that advertises the second mobility address of the pair (in the NLRI of the BGP message), and as shown at 112, encodes the MAC address (AA:BB:CC) and IP address (200.10.1.1) of the host 40 in cost community attributes of the BGP response message 110. Moreover, as shown in FIG. 2F, the Leaf21 deletes the MAC address and IP address of the host 40 from the HMM end-host table 50.

The response from the old leaf (Leaf21 in this example) does not need to include MAC address of the host, as the mobility address is sufficient to identify which MAC is being queried. This means one BGP cost community to encode the IP address may be enough in the BGP response message 110.

FIG. 2F shows that the Leaf21 sends the BGP response message 110 into the fabric 20(2), and it propagates through the fabric 20(2) (sent to every leaf node by operations of the S2/RR node) and into fabric 20(1) (by BL22), as shown by the dashed arrows, where it eventually is received by Leaf11, where the host is currently located. Since the BGP response message 110 includes the MAC address and the IP address of the host 40, Leaf11 will now know that the host with MAC address (AA:BB:CC) is tied to IP address (200.10.1.1).

Figure 2G:
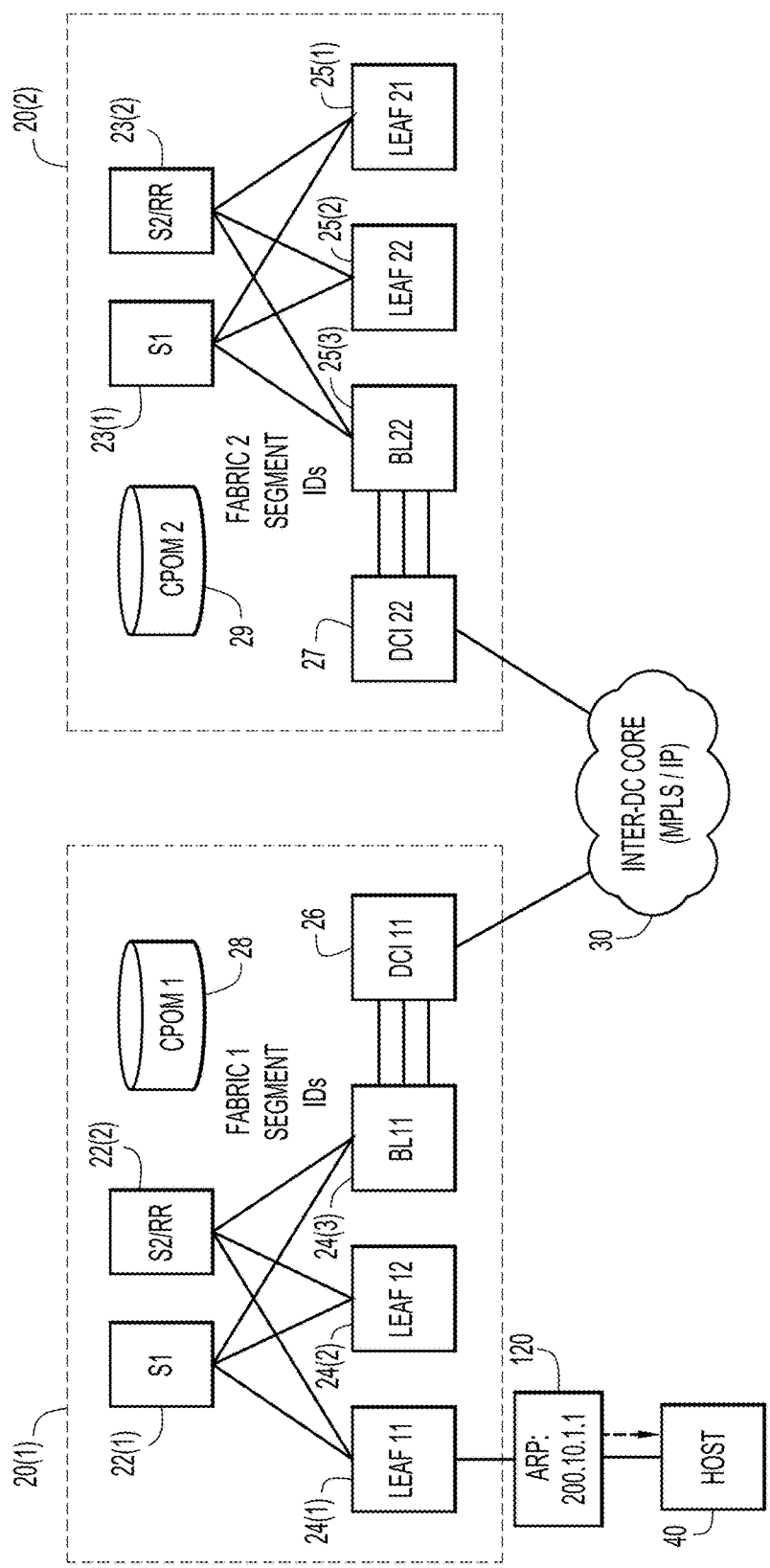
Figure 2H:
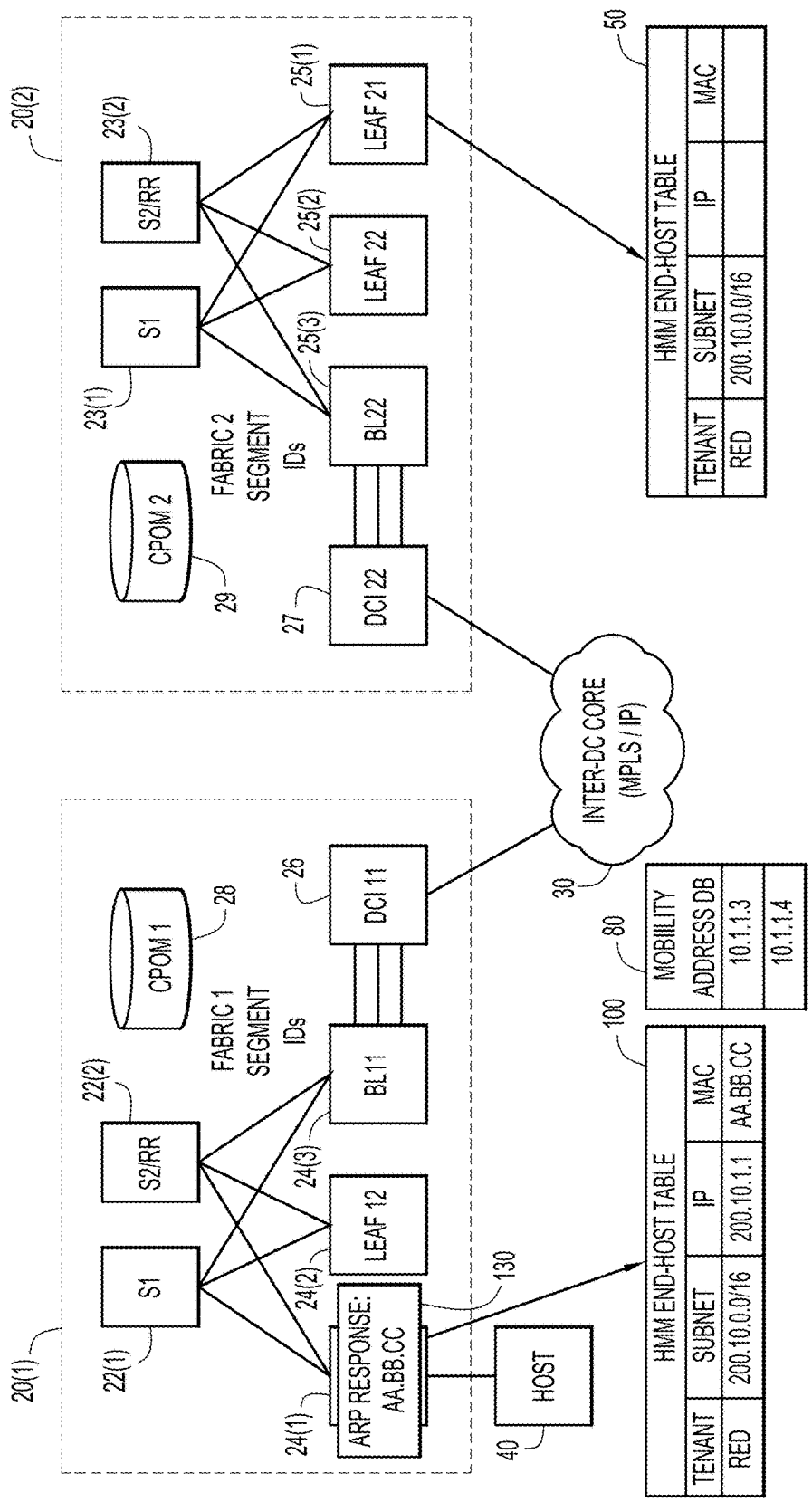

Next, as shown in FIG. 2G, Leaf11 sends towards the host 40 an ARP message 120 with the IP address (200.10.1.1). In FIG. 2H, the host 40 responds with an ARP response message 130 containing the MAC address (AA:BB:CC). Upon receiving the ARP response message 130 with the MAC address (AA:BB:CC), the Leaf11 confirms that the host 40 has IP address (200.10.1.1) and can advertise this into the fabric. The Leaf11 updates its HMM end-host table 50 to include an entry including the IP address (200.10.1.1) and MAC address (AA:BB:CC) for host 40.

Figure 2I:
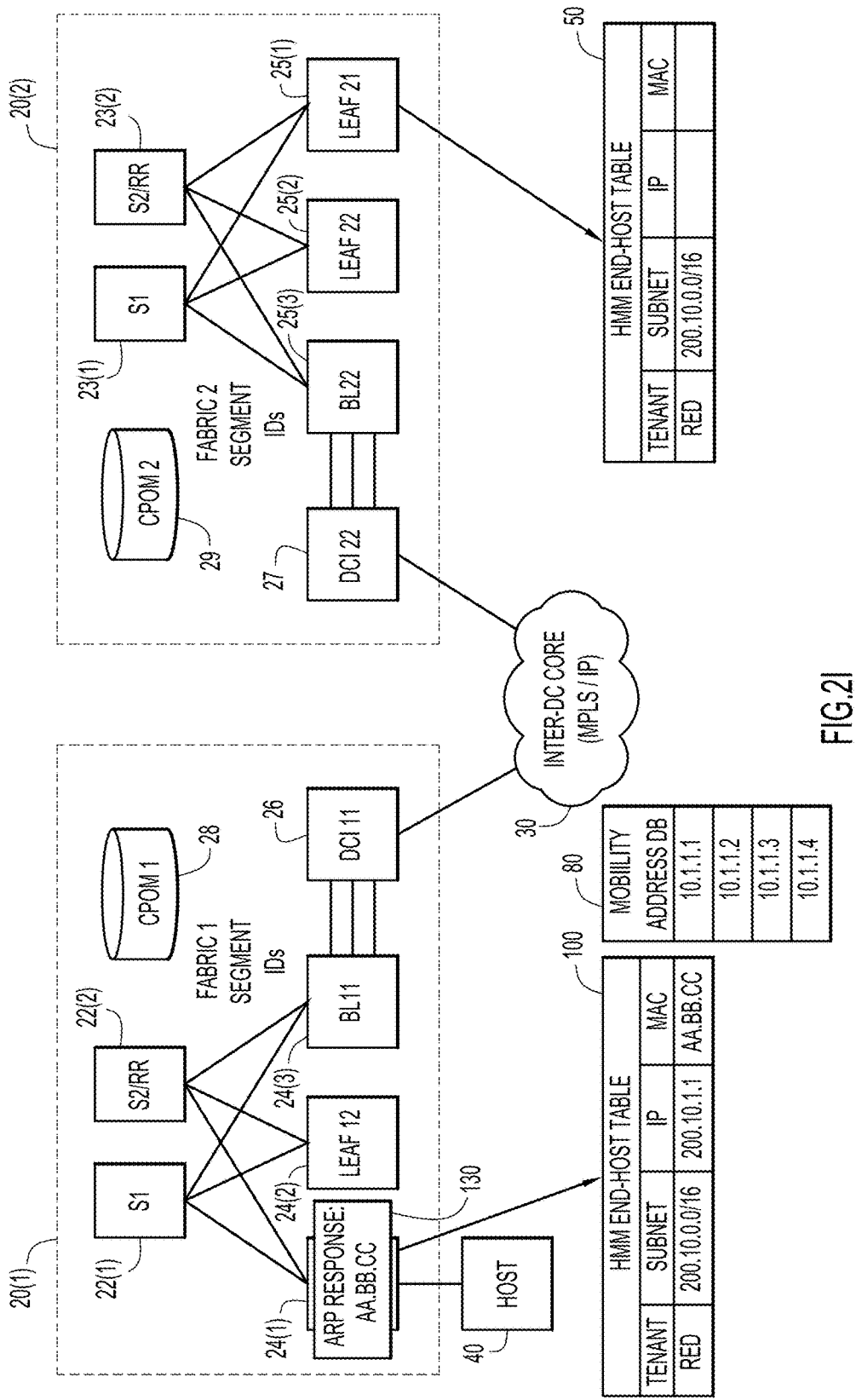

Turning to FIG. 2I, the HMM function of Leaf11 returns the mobility addresses 10.1.1.1 and 10.1.1.2 to the pool 80 of mobility addresses because the updates associated with the movement of host 40 from Leaf21 to Leaf11 is complete. Thus, these two mobility addresses are thereafter available for use in connection with movement of another host. HMM of Leaf11 will notify BGP to withdraw 10.1.1.1 and HMM of Leaf21 will notify BGP to withdraw 10.1.1.2 so that these two routes will be deleted from BGP routing table in the BGP nodes.

Note that in the example described in connection with FIGS. 2A-2I, the host move is an inter-fabric move because the host moves from a switch in fabric 20(2) to a switch in fabric 20(1). However, these techniques are equally applicable if the move is intra-fabric, that is, between switches in the same fabric.

As explained in the procedure above, each leaf node gets a unique pool of reserved addresses per tenant to use for communicating mobility events. A pair of addresses is used for the duration of the move. The first mobility address of the pair is used by the new leaf node (to which the host has moved), and from which the MAC address is sent (in a BGP update message), asking for the IP address of the host. The second mobility address is used by the old leaf node (where the host previously was connected) to advertise the MAC-to-IP binding of the host. Using unique mobility addresses for the the BGP update message and BGP response message obviates the need to have an addpath feature in MPLS core, and to manipulate a BGP cost community to ensure that the host advertisement reaches all leaf nodes.

A RARP broadcast within the fabric gives the fabric leaf nodes the opportunity to update their MAC tables in order to point to the new leaf node where the host has moved. The BGP update can be used to serve a similar purpose. The MAC address present in the cost community attribute of the BGP update message and the BGP next hop node can be used to obtain the switch identifier of the sending leaf node. When the route goes across fabrics, the next hop will be the border leaf of the local fabric and the leaf nodes in the other non-local fabric should not update their MAC tables. The origin of the route can be used to distinguish between routes originated in this fabric and those originated in another fabric. In other words, when leaf nodes detect that a BGP update message originated from another fabric, they do not update their MAC tables. In this way, the origin can serve the purpose of detecting an advertisement from a different fabric. Again, the techniques presented herein can be used for inter-fabric host moves as well as intra-fabric host moves.

Mobility Address Details

The RARP message 70 (FIG. 2A) does not have an IP address. MP BGP (unicast) advertises IPv4 or IPv6 addresses. By allocating a pool of IP addresses to serve as mobility addresses or identifiers, existing mechanisms can be used to transport the MAC address. The IP addresses allocated for the pool of mobility addresses are unique per leaf node (and per tenant). This ensures that the information is guaranteed to be carried within and across fabrics, without having to worry about conflicts, and without the need to have an addpath feature and a dedicated cost community value.

The mobility subnet, for example 10.128.0.0/9, is added as an aggregate route (no summary) at the border leaf node for the VRF functions the border leaf node hosts. This enables the border leaf node to let into the fabric the host addresses within a subnet from outside the fabric.

A user can reserve one subnet per tenant for creating a unique pool of IP addresses per leaf for use as mobility addresses. This subnet will then be appended with a fabric identifier (ID) (e.g., 5 bits) and switch (leaf) ID (12 bits) to create a unique pool per leaf node. A fabric ID of 2, 3 or 4 bits may be used for smaller deployments.

Consider the example in which a reserved subnet is 10.128.0.0/9. Then, 6 bits are available to create a mobility pool of 64 hosts per leaf. There are enough mobility addresses for 32 host moves (each move consumes two addresses) simultaneously per VRF per leaf. 64 simultaneous host moves are supported if the fabric ID is 4 bits and 128 if the fabric ID is 3 bits. This provisioning can easily be done by Power On Auto Provisioning (POAP) since the fabric ID and switch ID are known at a leaf node. A larger pool of mobility addresses can be reserved depending on how many fabrics a user has (fewer bits for a fabric ID) and/or for reserving a larger subnet.

Use of BGP Cost Communities to Encode MAC Address and IP Address

The BGP cost community provides an additive metric that could be accounted for in the BGP best-path selection process. This community also specifies the point of insertion in the BGP best-path selection procedure. A cost community may reprogram the best-path selection process. The BGP cost community as used in DFA has several desirable features:

1. It is transitive across autonomous system (AS) boundaries;
2. It is attached and interpreted by the HMM function of leaf nodes;
3. It is used for conveying a host move; and
4. It is used for conveying border leaf conversational learning.

Multiple Cost communities can be attached to BGP update. The information to be conveyed is 10 bytes (6 bytes for a MAC address and 4 bytes for an IPv4 subnet). Examples of existing cost communities are:

define BGP_EXTCOMMUNITY_COST_HMM_POI BGP_EXTCOMMUNITY_COST_PRE_BESTPATH
define BGP_EXTCOMMUNITY_COST_COMM_ID_ HMM_HOST_RT 0x60
define BGP_EXTCOMMUNITY_COST_COMM_ID_ HMM_PREFIX_RT 0x68
define BGP_EXTCOMMUNITY_COST_COMM_ID_ HMM_AGGR_PREFIX_RT 0x70

The following are examples of cost communities to advertise a MAC address in order to solicit an IP address binding (i.e., in the BGP update message 90 sent by the leaf node to which to a host moves):

define BGP_EXTCOMMUNITY_COST_HMM_POI BGP_EXTCOMMUNITY_COST_PRE_BESTPATH
define BGP_EXTCOMMUNITY_COST_COMM_ID_ HMM_HOST_RT 0x60
define BGP_EXTCOMMUNITY_COST_COMM_ID_ HMM_PREFIX_RT 0x68
define BGP_EXTCOMMUNITY_COST_COMM_ID_ HMM_AGGR_PREFIX_RT 0x70

The value field of the cost communities is 4 bytes long. The MAC address (6 bytes) plus subnet (4 bytes) requires 10 bytes to encode. Thus, three cost communities are needed to encode the 10 bytes. One example encoding scheme is as follows.

First cost community (CC) is subtype 0x71. The upper most significant nibble are reserved (can be used in future). The lower two bytes encode the upper two bytes of the MAC address.

The second CC is subtype 0x72. This encodes the remaining 4 bytes of the MAC address.

The third CC is subtype 0x73. This encodes 4 bytes of the subnet.

The following are examples of cost communities used to advertise a MAC to IP address binding (i.e., in the BGP response message 110 sent by the leaf node from which the host has moved):

define BGP_EXTCOMMUNITY_COST_ COMM_ID_HMM_CARRY_ADVT_L2_INFO_ THIRD 0x76
define BGP_EXTCOMMUNITY_COST_COMM_ID_ HMM_CARRY_ADVT_L2_INFO_SECOND 0x75
define BGP_EXTCOMMUNITY_COST_COMM_ID_ HMM_CARRY_ADVT_L2_INFO_FIRST 0x74

An example encoding scheme for advertising the MAC-to-IP binding is as follows.

The first CC is subtype 0x74. The upper most significant two bytes of the value field are reserved (can be used in future). The lower two bytes encode the upper two bytes of the MAC address.

The second CC is subtype 0x75. This encodes the remaining 4 bytes of the MAC address.

The third CC is subtype 0x76. This encodes 4 bytes of the host IP address associated with this MAC address (encoded in the first CC and second CC).

It is not necessary to encode the MAC address in the BGP response message as the mobility address is unique per the request. Thus, as explained above, the BGP response message can include only the IP address and thus can be encoded in only one CC.

Figure 3:
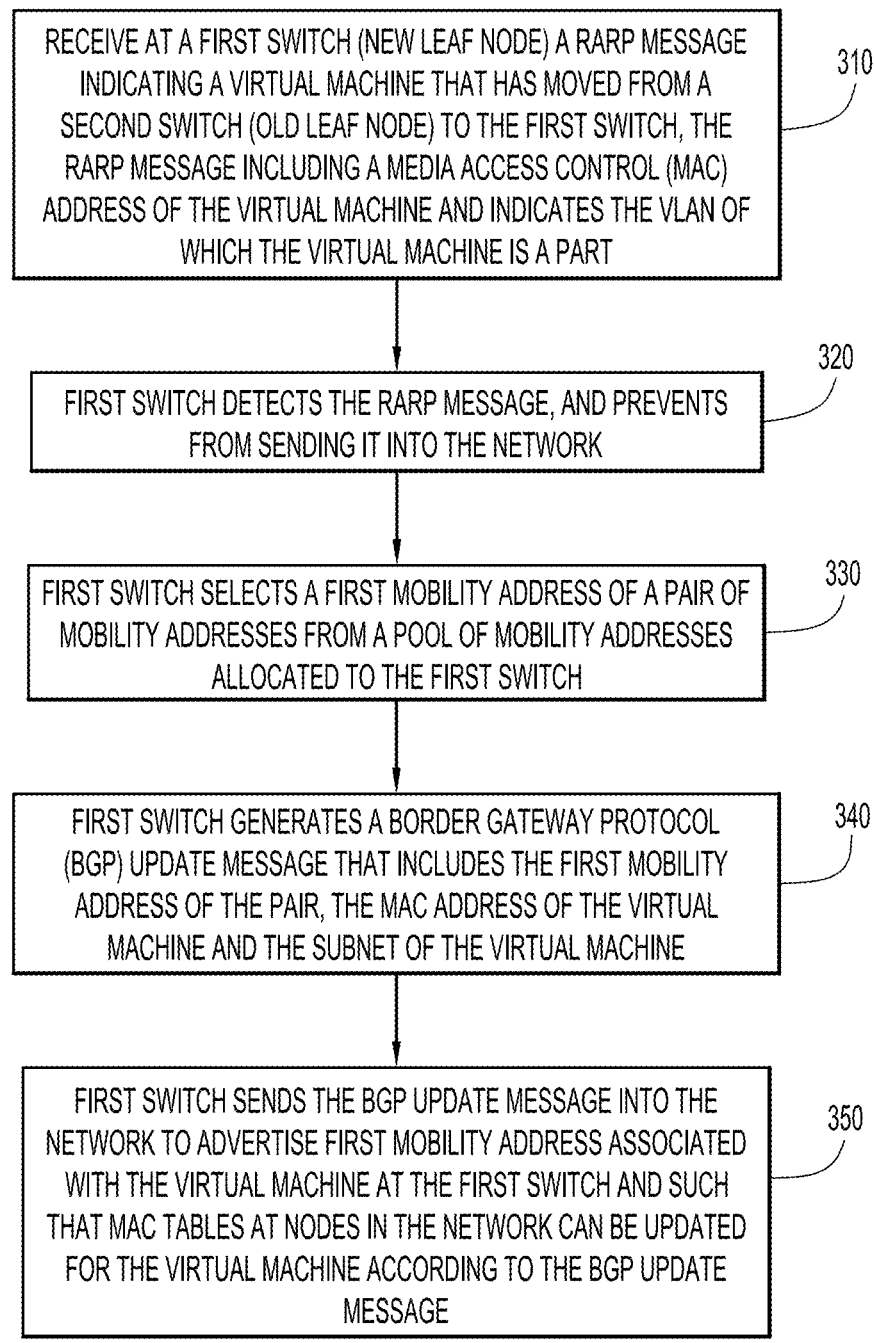
FIGS. 3-5 are flow charts depicting operations performed at a leaf switch in accordance with the signaling techniques shown in FIGS. 2A-2I.
Figure 4:
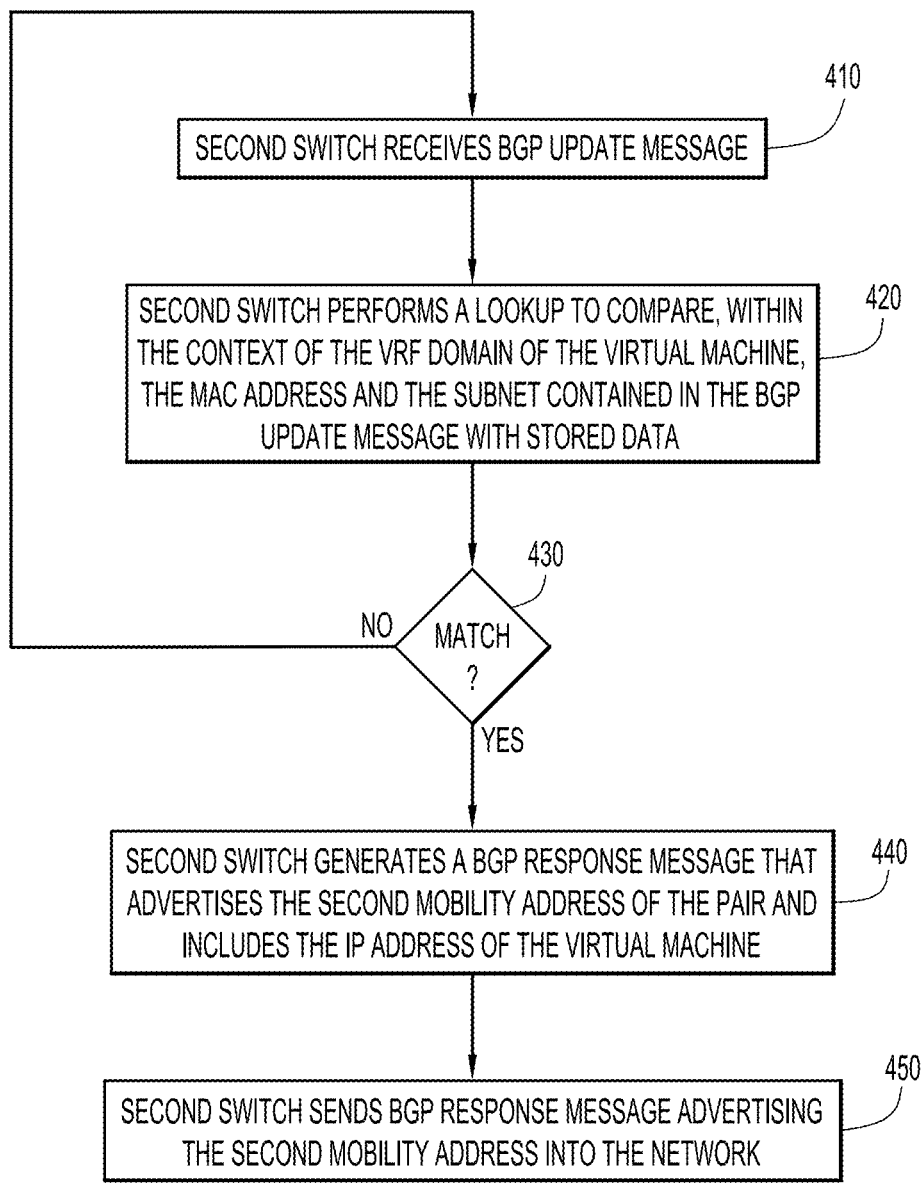
Figure 5:
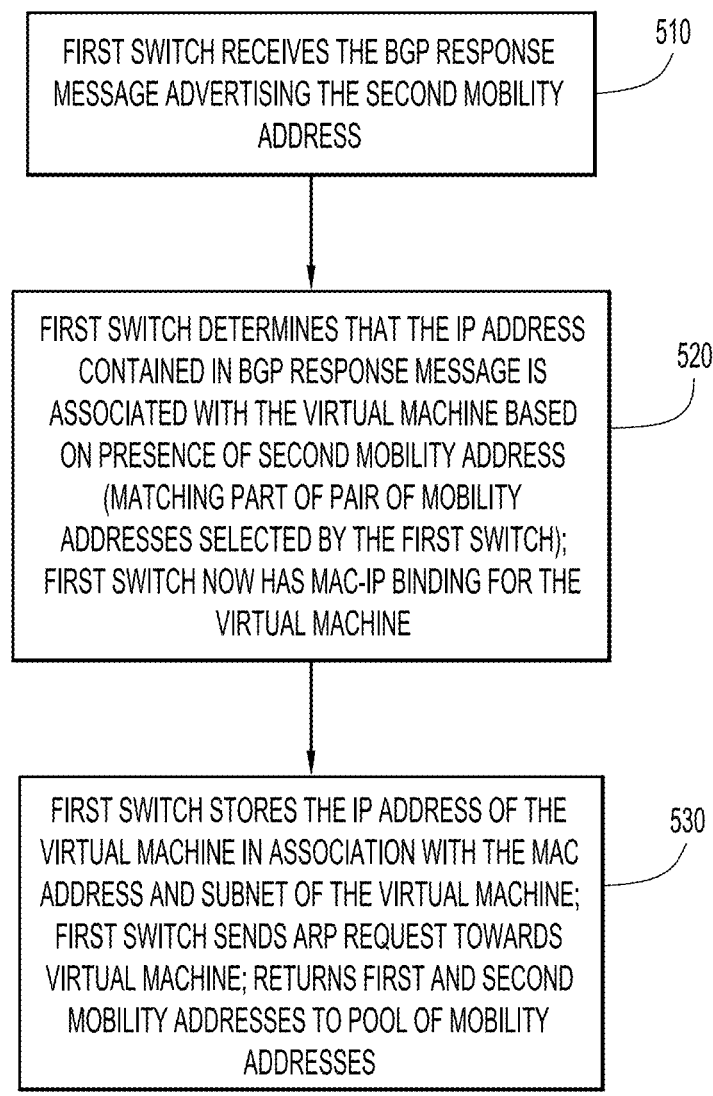

Reference is now made to FIG. 3. FIG. 3 illustrates a flow chart for operations performed at a leaf node (switch) described above in connection with FIGS. 2A-2D. FIG. 4 illustrates a flow chart that summarizes operations described above in connection with FIGS. 2E and 2F. FIG. 5 summarizes operations described above in connection with FIGS. 2G-2I. In FIGS. 3-5, more generic terminology is used for the leaf nodes involved. In particular, "a first switch" refers to the (new) leaf node to which a virtual machine (host) has moved and "a second switch" refers to the (old) leaf node from which the virtual machine has moved. The terms "first switch" and "second switch" are completely arbitrary and could refer to two switches within the same fabric segment or in different fabric segments.

Referring first to FIG. 3, a method 300 is now described. Upon moving from the second switch to the first switch, the virtual switch to which the virtual machine (host) is connected sends a RARP message to the first switch to which it moved. At 310, the first switch receives the RARP message. The RARP message indicates a virtual machine has moved from the second switch to the first switch. The RARP message includes a media MAC address of the virtual machine and indicates the VLAN of which the virtual machine is a part. The VLAN indicates a subnet and a VRF domain of the virtual machine, and the MAC address identifies the virtual machine within a context of the VLAN, subnet and the VRF domain.

At 320, the first switch detects the RARP message, and prevents from sending it into the network. In other words, the first switch traps/intercepts the RARP message and prevents it from being flooded into the network. At 330, the first switch selects a first mobility address of a pair of mobility addresses from a pool of mobility addresses allocated to the first switch. At 340, the first switch generates a BGP update message that includes the first mobility address of the pair, the MAC address of the virtual machine and the subnet of the virtual machine. The MAC address and subnet may be carried in cost community subtypes as described above. At 350, the first switch sends the BGP update message into the network to advertise the first mobility address associated with the virtual machine at the first switch and such that the MAC tables at nodes in the network can be updated for the virtual machine according to the BGP update message.

Turning now to FIG. 4, a method 400 is now described. As the BGP update message propagates through the network, each node that receives the message evaluates the content of the BGP update message to determine whether it is the node at which a virtual machine that has roamed, was previously connected. Eventually the BGP update message reaches the old leaf node, i.e., the second switch, as shown at 410. At 420, the second switch performs a lookup to compare, within the context of the VRF domain of the virtual machine, the MAC address and the subnet contained in the BGP update message with stored data that indicates a MAC address and a subnet within a VRF domain, and an IP address for each virtual machine served by the second switch. At 430, it is determined whether there is a match. If there is a match, the process continues at step 440, and if not, the process reverts back to step 410 for the next received BGP update message. At step 440, the second switch generates a BGP response message that advertises a second mobility address of the pair and includes the IP address of the virtual machine. The BGP response message may include the MAC address of the virtual machine, and the MAC address and IP address may be encoded in cost community subtypes, as described above. At step 450, the second switch sends the BGP response message that advertises the second mobility address, into the network.

Reference is now made to FIG. 5 that illustrates a flow chart of a method 500 performed at the first switch. The BGP response message sent by the second switch (old leaf node) propagates through the network and eventually reaches the first switch (new leaf node). At 510, the first switch receives the BGP response message that advertises the second mobility address. At 520, the first switch determines that the IP address contained in BGP response message is associated with the virtual machine based on presence of the second mobility address. This is because the first switch knows that the second mobility address is the matching part of the pair of mobility addresses that it selected when the first switch generated by the BGP update message. The first switch now has MAC address-to-IP address binding for the virtual machine. At 530, the first switch stores the IP address of the virtual machine in association with the MAC address and subnet of the virtual machine. The first switch sends an ARP request towards virtual machine and returns first and second mobility addresses to pool of mobility addresses.

It is to be understood that each leaf node is capable of performing the operations depicted in FIGS. 3-5, so that it can operate appropriately when it is a new leaf node for a virtual machine and when it is an old leaf node for a virtual machine.

Figure 6:
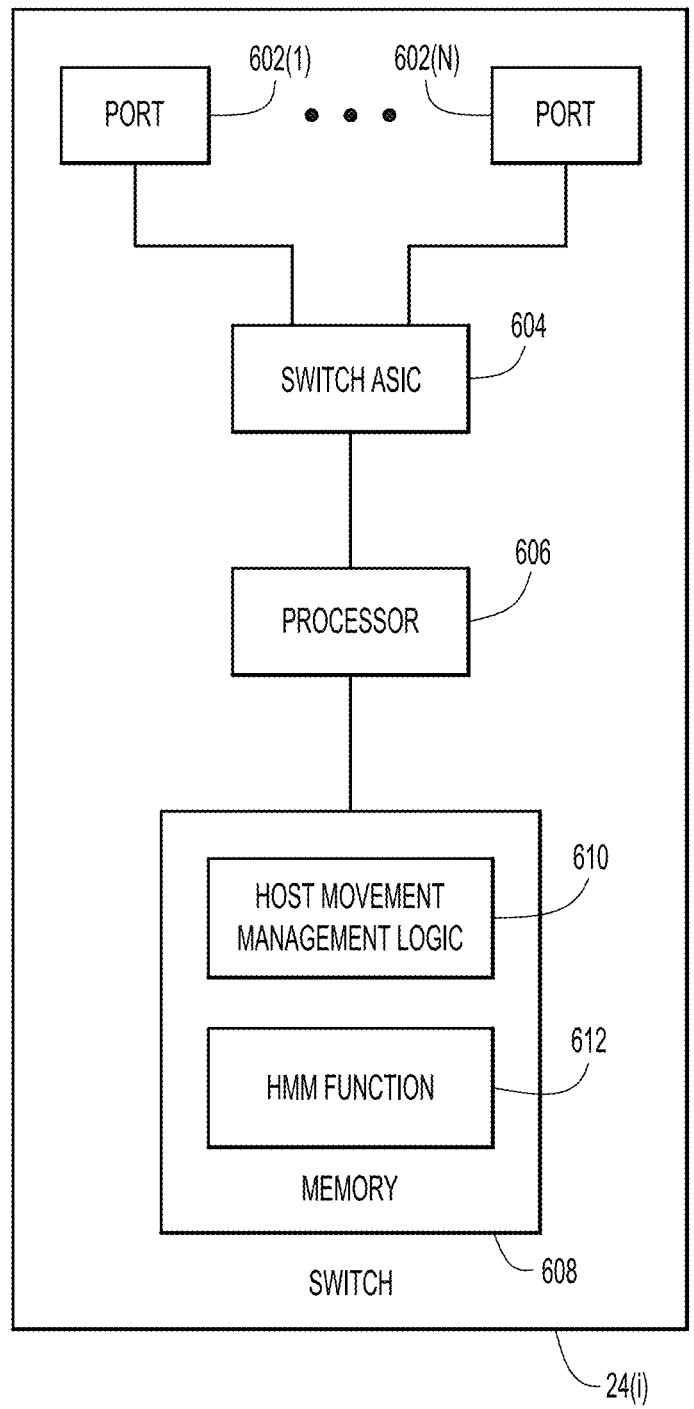
FIG. 6 is a block diagram of a leaf switch that is capable of performing the signaling techniques presented herein, according to an example embodiment.

FIG. 6 shows a block diagram of a leaf node (switch) generically represented by reference numeral 24(*i*). The block diagram of FIG. 6 is meant to be representative of any of the leaf switches shown in FIG. 1, and FIGS. 2A-2I. Switch 24(*i*) comprises a plurality of ports 602(1)-602(N), a switch application specific integrated circuit (ASIC) 604 (also called a switch unit or switch module), a processor 606 and memory 608. The ports 602(1)-602(N) are configured to receive communications (e.g., packets, provisioning information, etc.) from devices in the network 100 and are configured to send communications to devices the network 100. The ports 602(1)-602(N) are coupled to the switch ASIC 604, which is responsible for switching the communications to appropriate network devices. The switch ASIC 604 is coupled to the processor 606. The processor 606 is, for example, a microprocessor or microcontroller that is configured to execute program logic instructions (i.e., software) for carrying out various operations and tasks of the switch 24(*i*), as described above. For example, the processor 606 is configured to execute host movement management logic 610 and HMM function 612 to perform the operations depicted in FIGS. 2A-2I, and 3-5, and described herein.

The host movement management logic 610 and HMM function 612 may take any of a variety of forms, so as to be encoded in one or more tangible computer readable memory media or storage device for execution, such as fixed logic or programmable logic (e.g., software/computer instructions executed by a processor), and the processor 606 may be an ASIC that comprises fixed digital logic, or a combination thereof.

For example, the processor 606 may be embodied by digital logic gates in a fixed or programmable digital logic integrated circuit, which digital logic gates are configured to perform the resource configuration software 610 and HMM function 612. In general, the host movement management logic 610 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by leaf switches may be performed by one or more computer or machine readable storage media (non-transitory) or device executed by a processor and comprising software, hardware or a combination of software and hardware to perform the techniques described herein.

In summary, the techniques presented herein are useful to signal where a host has moved, using MP BGP alone. These techniques are particularly useful in a multi-vendor environment using existing standards. RARP broadcast is no longer needed, therefore, no L2 extension is needed across DCI for tenants that do not require L2 extension for purposes other than a host move. This scheme works for both inter- and intra-fabric moves. The MAC address is transported only on as-needed basis (only for host move), thereby saving memory and processing resources. These techniques also do not require a new control plane or protocol extension, but rather relies on the well proven, widely-deployed MP BGP model.

In one form, a method is provided comprising: in a network that includes a plurality of switches including a first switch and a second switch, receiving at the first switch a reverse address resolution protocol message indicating a virtual machine has moved from the second switch to the first switch, the reverse address resolution protocol message including a media access control (MAC) address of the virtual machine and indicating a virtual local area network (VLAN) of which the virtual machine is a part, and wherein the VLAN indicates a subnet and Virtual Routing Forwarding (VRF) domain of the virtual machine, and the MAC address identifies the virtual machine within a context of the VLAN, subnet and the VRF domain; detecting the reverse address resolution protocol message at the first switch, and preventing from sending the reverse address resolution protocol message into the network; selecting a first mobility address of a pair of mobility addresses from a pool of mobility addresses allocated to the first switch; generating a Border Gateway Protocol (BGP) update message that includes the first mobility address, the MAC address of the virtual machine and the subnet of the virtual machine; and sending the BGP update message into the network to advertise the first mobility address associated with the virtual machine at the first switch and such that MAC tables at nodes in the network can be updated for the virtual machine according to the BGP update message.

In another form, a method is provided comprising: in a network including a plurality of switches including a first switch and a second switch, receiving at the second switch from which a virtual machine has moved, a Border Gateway Protocol (BGP) update message sent by the first switch to which the virtual machine has moved, the BGP update message advertising in association with the virtual machine a first mobility address of a pair of mobility addresses, a media access control (MAC) address of the virtual machine and a subnet of the virtual machine; comparing, within a Virtual Routing Forwarding (VRF) domain, the MAC address and the subnet contained in the BGP update message with stored data at the second switch, the stored data including a MAC address and a subnet within a VRF domain, and an Internet Protocol (IP) address for each virtual machine served by the second switch; upon determining a match of the MAC address and subnet contained in the BGP update message with the stored data, generating a BGP response message that advertises a second mobility address of the pair and includes the IP address of the virtual machine; and sending the BGP response message advertising the second mobility address into the network.

Similarly, an apparatus is provided comprising a plurality of ports each to send and/or receive packets over a network that includes a plurality of switches including a first switch and a second switch; a memory that stores a subnet a media access control (MAC) address and a subnet within a Virtual Routing Forwarding (VRF) domain, and an Internet Protocol (IP) address for each virtual machine that is served by the second switch; and a processor to: obtain a Border Gateway Protocol (BGP) update message received at one of the ports sent by the first switch to which a virtual machine has moved from the second switch, the BGP update message advertising a first mobility address of a pair of mobility addresses, a media access control (MAC) address of the virtual machine and a subnet of the virtual machine; compare, within a VRF domain, the MAC address and the subnet contained in the BGP update message with the data stored in the memory; upon determining a match of the MAC address and subnet contained in the BGP update message with data stored in the memory, generate a BGP response message that advertises a second mobility address of the pair and includes the IP address of the virtual machine.

Further still, a system is provided comprising: a plurality of switches arranged in a spine and leaf architecture such that each of a plurality of leaf switches is connected to each of a plurality of spine switches, the plurality of leaf switches including a first switch and a second switch; wherein the first switch: receives a reverse address resolution protocol message indicating a virtual machine has moved from the second switch to the first switch, the reverse address resolution protocol message including a media access control (MAC) address of the virtual machine and indicating a virtual local area network (VLAN) of which the virtual machine is a part, and wherein the VLAN indicates a subnet and VRF domain of the virtual machine, and the MAC address identifies the virtual machine within a context of the VLAN, subnet and the VRF domain; detects the reverse address resolution protocol message, and prevents from sending the reverse address resolution protocol message into the network; selects a first mobility address of a pair of mobility addresses from a pool of mobility addresses allocated to the first switch; generates a Border Gateway Protocol (BGP) update message that includes the first mobility address, the MAC address of the virtual machine and the subnet of the virtual machine; and sends the BGP update message into the network to advertise first mobility address associated with the virtual machine at the first switch and such that MAC tables at nodes in the network can be updated for the virtual machine according to the BGP update message; and wherein the second switch: receives the BGP update message; compares the MAC address and the subnet contained in the BGP update message within the context of the VRF domain of the virtual machine with stored data that indicates a MAC address and a subnet within a VRF domain, an Internet Protocol (IP) address for each virtual machine served by the second switch; upon determining a match of the MAC address and subnet contained in the BGP update message with the stored data, generates a BGP response message that advertises a second mobility address of the pair and includes the IP address of the virtual machine; and sends the BGP response message that advertises the second mobility address into the network.

While various embodiments are disclosed herein, it should be understood that they have been presented by way of example only, and not limitation. It will be apparent to persons skilled in the relevant art that various changes in form and detail may be made therein without departing from the spirit and scope of what is described herein. Thus, the breadth and scope of the claims should not be limited by any of the example embodiments disclosed herein.

What is claimed is:

1. A method comprising:
   in a network that includes a plurality of switches including a first switch and a second switch, receiving at the first switch a reverse address resolution protocol message indicating a virtual machine has moved from the second switch to the first switch, the reverse address resolution protocol message including a media access control (MAC) address of the virtual machine and indicating a virtual local area network (VLAN) of which the virtual machine is a part, and wherein the VLAN indicates a subnet and Virtual Routing Forwarding (VRF) domain of the virtual machine, and the MAC address identifies the virtual machine within a context of the VLAN, subnet and the VRF domain;
   detecting the reverse address resolution protocol message at the first switch, and preventing from sending the reverse address resolution protocol message into the network;
   selecting a first mobility address of a pair of mobility addresses from a pool of mobility addresses allocated to the first switch;
   generating a Border Gateway Protocol (BGP) update message that includes the first mobility address, the MAC address of the virtual machine and the subnet of the virtual machine; and
   sending the BGP update message into the network to advertise the first mobility address associated with the virtual machine at the first switch and such that MAC tables at nodes in the network can be updated for the virtual machine according to the BGP update message.

2. The method of claim 1, wherein generating the BGP update message comprises encoding the MAC address and subnet in one or more existing extended transitive BGP communities.

3. The method of claim 2, wherein encoding comprises encoding the MAC address and subnet in a plurality of BGP cost community subtypes.

4. The method of claim 1, wherein the pool of mobility addresses is unique to the first switch.

5. The method of claim 1, further comprising:
   receiving the BGP update message at the second switch;
   comparing, within the context of the VRF domain of the virtual machine, the MAC address and the subnet contained in the BGP update message with stored data that indicates a MAC address and a subnet within a VRF domain, and an Internet Protocol (IP) address for each virtual machine served by the second switch;
   upon determining a match of the MAC address and subnet contained in the BGP update message with the stored data, generating a BGP response message that advertises a second mobility address of the pair and includes the IP address of the virtual machine; and
   sending the BGP response message that advertises the second mobility address into the network.

6. The method of claim 5, wherein generating the BGP response message comprises including the MAC address of the virtual machine.

7. The method of claim 6, wherein generating the BGP response message comprises encoding the MAC address and the IP address of the virtual machine in one or more existing extended transitive BGP communities.

8. The method of claim 5, wherein generating the BGP response message comprises encoding the IP address of the virtual machine in one or more existing extended transitive BGP communities.

9. The method of claim 8, wherein encoding comprises encoding the IP address in a BGP cost community subtype.

10. The method of claim 5, further comprising determining the second mobility address from the first mobility address.

11. The method of claim 5, further comprising deleting the IP address and the MAC address at the second switch.

12. The method of claim 5, further comprising:
    receiving the BGP response message at the first switch;
    determining that the IP address contained in the BGP response message is associated with the virtual machine based on presence of the second mobility address in the BGP response message; and
    storing at the first switch the IP address of the virtual machine in association with the MAC address of the virtual machine and the subnet of the virtual machine.

13. The method of claim 12, further comprising returning the pair of mobility addresses to the pool of mobility addresses.

14. The method of claim 1, wherein the first and second switches are leaf switches among the plurality of switches that also include a plurality of spine switches, such that each leaf switch is connected to each spine switch.

15. The method of claim 14, wherein the first switch and the second switch are in different fabric segments.

16. A method comprising:
    in a network including a plurality of switches including a first switch and a second switch, receiving at the second switch from which a virtual machine has moved, a Border Gateway Protocol (BGP) update message sent by the first switch to which the virtual machine has moved, the BGP update message advertising in association with the virtual machine a first mobility address of a pair of mobility addresses, a media access control (MAC) address of the virtual machine and a subnet of the virtual machine;
    comparing, within a Virtual Routing Forwarding (VRF) domain, the MAC address and the subnet contained in the BGP update message with stored data at the second switch, the stored data including a MAC address and a subnet within a VRF domain, and an Internet Protocol (IP) address for each virtual machine served by the second switch;
    upon determining a match of the MAC address and subnet contained in the BGP update message with the stored data, generating a BGP response message that advertises a second mobility address of the pair and includes the IP address of the virtual machine; and
    sending the BGP response message advertising the second mobility address into the network.

17. The method of claim 16, wherein generating the BGP response message comprises including the MAC address of the virtual machine.

18. The method of claim 17, wherein generating the BGP response message comprises encoding the MAC address of the virtual machine and the IP address of the virtual machine in one or more existing extended transitive BGP communities.

19. The method of claim 16, further comprising determining the second mobility address from the first mobility address.

20. The method of claim 16, further comprising deleting the IP address and MAC address at the second switch.

21. An apparatus comprising:
a plurality of ports each to send and/or receive packets over a network that includes a plurality of switches including a first switch and a second switch;
a memory that stores a media access control (MAC) address and a subnet within a Virtual Routing Forwarding (VRF) domain, and an Internet Protocol (IP) address for each virtual machine that is served by the second switch; and
a processor to:
obtain a Border Gateway Protocol (BGP) update message received at one of the ports sent by the first switch to which a virtual machine has moved from the second switch, the BGP update message advertising a first mobility address of a pair of mobility addresses, a media access control (MAC) address of the virtual machine and a subnet of the virtual machine;
compare, within a VRF domain, the MAC address and the subnet contained in the BGP update message with the data stored in the memory;
upon determining a match of the MAC address and subnet contained in the BGP update message with data stored in the memory, generate a BGP response message that advertises a second mobility address of the pair and includes the IP address of the virtual machine.

22. The apparatus of claim 21, wherein the processor generates the BGP response message to further include the MAC address of the virtual machine.

23. The apparatus of claim 22, wherein the processor generates the BGP response message by encoding the MAC address of the virtual machine and the IP address of the virtual machine in one or more existing extended transitive BGP communities.

24. The apparatus of claim 21, wherein the processor generates the BGP response message by encoding the IP address of the virtual machine in one or more existing extended transitive BGP communities.

25. The apparatus of claim 24, wherein the processor encodes the IP address in a BGP cost community subtype.

26. The apparatus of claim 21, wherein the processor determines the second mobility address from the first mobility address.

27. A system comprising:
a plurality of switches arranged in a spine and leaf architecture such that each of a plurality of leaf switches is connected to each of a plurality of spine switches, the plurality of leaf switches including a first switch and a second switch;
wherein the first switch:
receives a reverse address resolution protocol message indicating a virtual machine has moved from the second switch to the first switch, the reverse address resolution protocol message including a media access control (MAC) address of the virtual machine and indicating a virtual local area network (VLAN) of which the virtual machine is a part, and wherein the VLAN indicates a subnet and VRF domain of the virtual machine, and the MAC address identifies the virtual machine within a context of the VLAN, subnet and the VRF domain;
detects the reverse address resolution protocol message, and prevents from sending the reverse address resolution protocol message into the network;
selects a first mobility address of a pair of mobility addresses from a pool of mobility addresses allocated to the first switch;
generates a Border Gateway Protocol (BGP) update message that includes the first mobility address, the MAC address of the virtual machine and the subnet of the virtual machine; and
sends the BGP update message into the network to advertise first mobility address associated with the virtual machine at the first switch and such that MAC tables at nodes in the network can be updated for the virtual machine according to the BGP update message;
wherein the second switch:
receives the BGP update message;
compares the MAC address and the subnet contained in the BGP update message within the context of the VRF domain of the virtual machine with stored data that indicates a MAC address and a subnet within a VRF domain, an Internet Protocol (IP) address for each virtual machine served by the second switch;
upon determining a match of the MAC address and subnet contained in the BGP update message with the stored data, generates a BGP response message that advertises a second mobility address of the pair and includes the IP address of the virtual machine; and
sends the BGP response message that advertises the second mobility address into the network.

28. The system of claim 27, wherein the first switch:
receives the BGP response message;
determines that the IP address contained in the BGP response message is associated with the virtual machine based on presence of the second mobility address in the BGP response message; and
stores the first IP address of the virtual machine in association with the MAC address of the virtual machine and the subnet of the virtual machine.

29. The system of claim 28, wherein the first switch returns the pair of mobility addresses to the pool of mobility addresses.

* * * * *